(12) United States Patent
Norris et al.

(10) Patent No.: US 8,644,425 B2
(45) Date of Patent: Feb. 4, 2014

(54) WIRELESS COMMUNICATIONS DEVICE HAVING WAVEFORM BANKS WITH FREQUENCY OFFSET AND RELATED METHODS

(75) Inventors: James A. Norris, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 118 days.

(21) Appl. No.: 13/312,476

(22) Filed: Dec. 6, 2011

(65) Prior Publication Data
US 2013/0142286 A1 Jun. 6, 2013

(51) Int. Cl.
*H04L 27/00* (2006.01)

(52) U.S. Cl.
USPC ........... 375/325; 375/274; 375/336; 375/340; 329/300

(58) Field of Classification Search
USPC ......... 375/272, 274, 324, 325, 323, 329, 336, 375/340, 341; 329/300, 311, 313
See application file for complete search history.

(56) References Cited

U.S. PATENT DOCUMENTS

| | | | |
|---|---|---|---|
| 5,953,370 A | 9/1999 | Durrant et al. | 375/208 |
| 6,233,290 B1 * | 5/2001 | Raphaeli | 375/341 |
| 6,317,452 B1 | 11/2001 | Durrant et al. | 375/130 |
| 6,389,079 B2 * | 5/2002 | Raheli et al. | 375/262 |
| 6,608,873 B1 * | 8/2003 | Spinnler et al. | 375/343 |
| 6,959,054 B2 | 10/2005 | Li et al. | 375/343 |
| 7,609,614 B2 | 10/2009 | Fonseka et al. | 370/208 |
| 7,636,399 B2 | 12/2009 | Brown et al. | 375/260 |
| 2007/0030926 A1 * | 2/2007 | Brown et al. | 375/340 |

* cited by examiner

*Primary Examiner* — Dac Ha
(74) *Attorney, Agent, or Firm* — Allen, Dyer, Doppelt, Milbrath & Gilchrist, P.A.

(57) ABSTRACT

A wireless communications device includes a receiver, and a demodulator coupled downstream from the receiver and configured to use a continuous phase modulation (CPM) waveform to non-coherently demodulate a received signal. The demodulator is configured to generate waveform banks, each waveform bank having a respective different frequency offset associated therewith, determine a correlation output metric for each waveform bank, select a waveform bank for demodulating the received signal based upon the correlation output metrics of the waveform banks, and demodulate the received signal using the selected waveform bank and the associated frequency offset.

25 Claims, 6 Drawing Sheets

WIRELESS COMMUNICATIONS DEVICE HAVING WAVEFORM BANKS WITH FREQUENCY OFFSET AND RELATED METHODS

FIELD OF THE INVENTION

The present invention relates to the field of communications, and, more particularly, to a continuous phase modulation wireless communications device and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communications signals.

Before transmission, the typical mobile communications device modulates digital data onto an analog signal. As will be readily appreciated by the skilled person, there is a plurality of modulations available for most applications. Some particularly advantageous modulations include, for example, continuous phase modulation (CPM). The constant envelope characteristics of this modulation provide for lower energy demands on the power amplifier of mobile communications devices, for example, by reducing the peak-to-average power ratio (PAPR), increasing average transmit power (providing greater transmission range), and increasing amplifier efficiency, i.e. allowing the use of non-linear amplifiers such as Class C amplifiers. Moreover, CPM provides for efficient use of available bandwidth.

A potential drawback of CPM modulations is the use of the inherent memory of the modulation when demodulating/decoding the waveform in order to obtain good demodulator performance. When the mobile communications device receives a transmitted signal which uses a modulation with memory, the decoder uses not only the current signal portion to demodulate but in addition uses information from previous signal portions, i.e. memory, to demodulate the current signal. In other words, the phase of the transmitted signal is dependent on previous signaling intervals.

Decoding modulations with memory increases the computational and memory demands on the transceiver, i.e. a maximum likelihood sequence estimator (MLSE) or the Bahl-Cocke-Jelinek-Raviv (BCJR) algorithm is typically used to demodulate modulations with memory, thereby increasing the complexity of the device, which may be undesirable in a limited power compact mobile device. More so, when the received signal has a multipath component to it, the size of the MLSE or BCJR trellis structure used to demodulate the signal grows exponentially, which may make practical implementation in a mobile communications device difficult since computational resources are limited.

In typical mobile communications devices that use CPM modulations, the demodulator includes the MLSE and a bank of matched filters. In these approaches, symbol timing, removal of frequency offset, and removal of phase offset may be required for optimum performance. As will be appreciated by those skilled in the art, the removal of phase and frequency offset is required in coherent demodulation, i.e. the phase offset and frequency offset must be known and/or tracked by the receiving device. In non-coherent demodulation applications, i.e. where there is no phase offset and frequency offset tracking information, the performance of the demodulator can degrade quickly with large frequency offsets, for example, the bit error rate (BER) may increase.

In some applications for ultra high frequency (UHF) satellite communications, the device may include a plurality of CPM modems that utilize a fast Fourier transform (FFT) acquisition method to determine the difference in phase (i.e. phase error) and in frequency between the transmit radio and the receive radio (i.e. typically referred to as frequency offset or frequency error). Any residual error in frequency and phase may be reduced with a phase locked loop (PLL). The PLL is typically used in radio communications to create a reproduction of the transmitted carrier frequency (typically with a numerically controlled oscillator (NCO) to generate the signal). This local copy is then used to remove the frequency and phase offset of the received signal. Residual errors in this process may reduce the BER performance of the receiver.

In some applications, the receiver device may have an initial frequency acquisition process—the goal is to estimate the phase and frequency of the incoming signal. A Fourier (or Laplace) transform can be used for known periodic signals while multiple frequency offset hypotheses can be performed for known, pseudo-random sequences. Each hypothesis is generated by rotating the expected pseudo-random sequence by the appropriate frequency offset. The receiver then uses correlation metrics to determine an estimate of the frequency offset.

In some applications, a modem preamble is used that is relatively short and that is designed to allow for non-coherent demodulation of the CPM signal using a simple frequency discrimination method. The preamble comprises an alternating, modulated pattern with +3 and −3 symbols ('00' and '11' data values). Due to the nature of some applications, FFT's are difficult to perform at the receiver due to discontinuities in the receive signal stream. In particular, the phase discontinuities appear as sin(x)/x resolution errors in the FFT output. A PLL may require that the alternating pattern ('11' and '00') be removed from the received signal to uncover the frequency and phase of the incoming signal. Nonetheless, errors in estimating the value of the incoming symbol and the periodic phase errors due to the nature of the signal reception may increase the time required for the PLL to determine the "lock-in" range (capture) of the received signal and generate the local copy of the transmitted signal with the correct frequency and phase. In a high noise environment, this may prove to be problematic.

One approach is disclosed in U.S. Pat. No. 7,636,399 to Brown et al. The device disclosed includes a non-coherent receiver comprising a bank of CPM waveform matched filters for obtaining branch metrics for each consecutive CPM symbol. The device also includes a recursive inner decoder cooperating with the bank of filters. Although this receiver device is referred to as "non-coherent," it attempts to estimate the frequency and phase of the signal via the metric computations and a forgetting factor.

SUMMARY OF THE INVENTION

In view of the foregoing background, it is therefore an object of the present invention to provide a non-coherent demodulator with improved performance, such as based upon a lower BER.

This and other objects, features, and advantages in accordance with the present invention are provided by a wireless communications device comprising a receiver, and a demodulator coupled downstream from the receiver. The demodulator may be configured to use any CPM waveform, and in some embodiments, a subset of its trellis structure (e.g.

a 4-ary version of Minimum-shift keying (MSK) modulation and a subset of its trellis), to non-coherently demodulate the received signal by at least generating a plurality of waveform banks, each waveform bank having a respective different frequency offset associated therewith, determining a correlation output metric for each waveform bank, selecting a waveform bank for demodulating the received signal based upon the correlation output metrics of the plurality of waveform banks, and demodulating the received signal using the selected waveform bank and the associated frequency offset. Advantageously, the wireless communications device may demodulate non-coherent signals with improved quality of service (QoS), such as BER.

More specifically, the demodulator may be configured to generate each waveform bank based upon a subset of a CPM trellis structure spanning a plurality of symbols and a plurality of transition paths which end in a same final state. The demodulator may be configured to generate a correlation value for each transition path. In some embodiments, the demodulator may be configured to output the middle symbol of the best transition path (i.e. winning correlation value) as demodulated data, the middle symbol in time generating a respective correlation value and being determined based upon a threshold, such as maximum or minimum values.

Additionally, the demodulator may be configured to determine the ("best") correlation output metric for each waveform bank based upon the correlation values therein, such as an average value of the maximum or minimum correlation values. The demodulator may be configured to generate each waveform bank comprising a plurality of potential waveforms spanning multiple symbols, each waveform bank spanning multiple symbols based upon respective waveform states and the CPM trellis structure.

Another aspect is directed to a method of non-coherently demodulating a received signal having a CPM waveform with a wireless communications device comprising a demodulator coupled downstream from a receiver. The method includes using the demodulator to generate a plurality of waveform banks, each waveform bank having a respective different frequency offset associated therewith, using the demodulator to determine a ("best") correlation output metric for each waveform bank, using the demodulator to select a waveform bank for demodulating the received signal based upon the "best" correlation output metrics of the plurality of waveform banks, and using the demodulator to demodulate the received signal using the selected waveform bank and the associated frequency offset.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
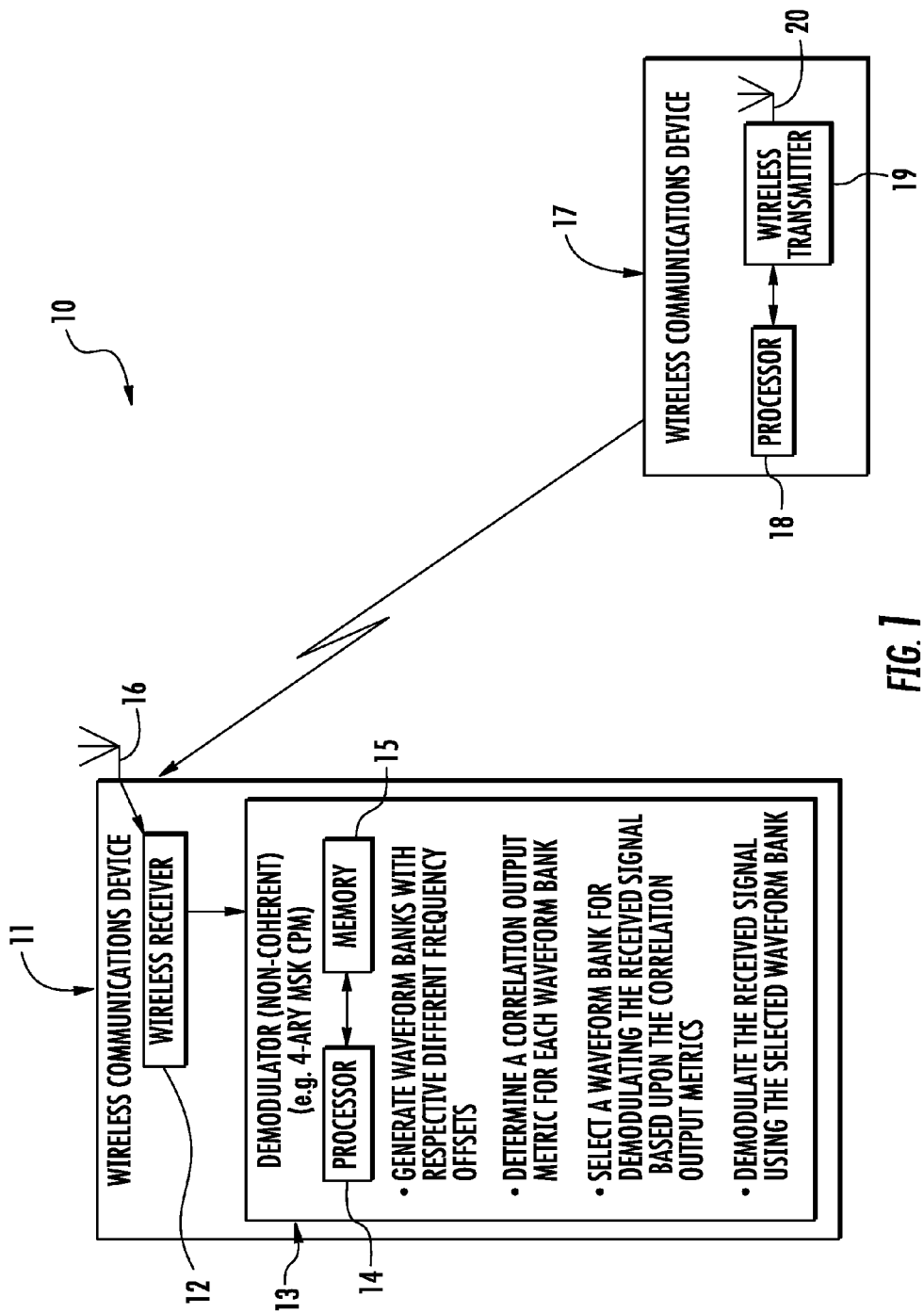
FIG. 1 is a schematic block diagram of the wireless communication system, according to the present invention.
Figure 2:
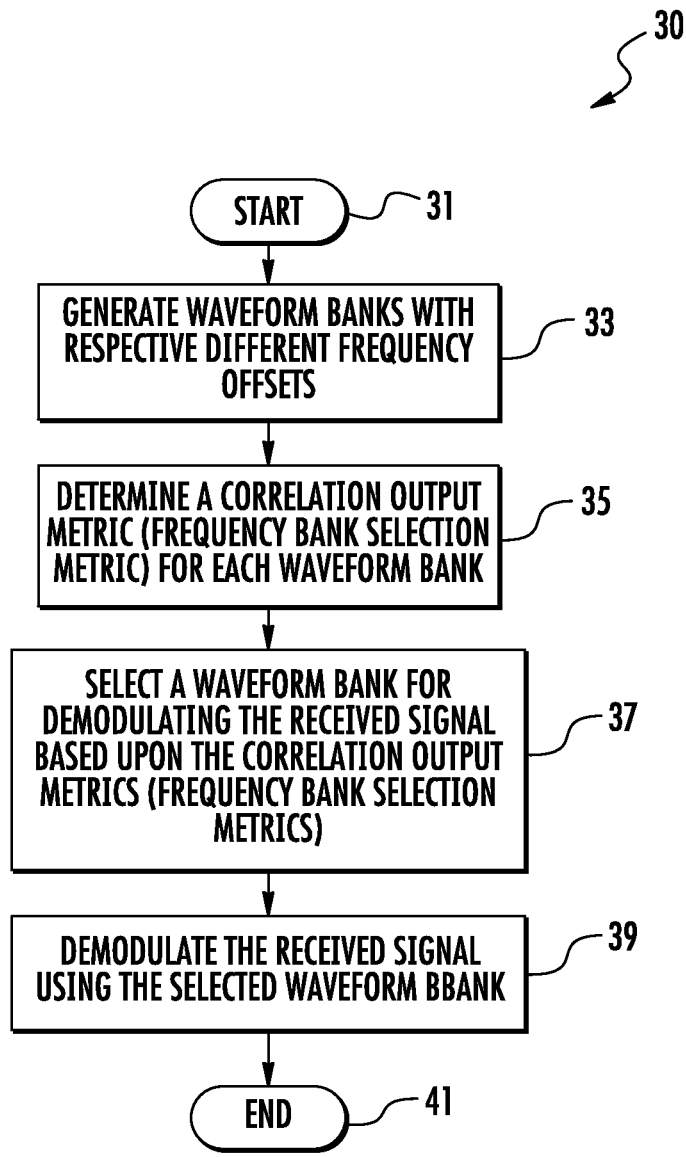
FIG. 2 is a flowchart illustrating operation of the receiver wireless communications device of FIG. 1.

Referring initially to FIGS. 1-2, a wireless communication system 10 and a flowchart 30 describing operation thereof according to the present invention are now described. The wireless communication system 10 illustratively includes a pair of wireless communications devices 11, 17. Of course, as will be readily appreciated, the wireless communication system 10 may comprise additional wireless devices of varying types. The wireless communication system 10 includes a receiver wireless communications device 11, and a transmitter wireless communications device 17.

The transmitter wireless communications device 17 includes a processor 18, a wireless transmitter 19 coupled to the processor, and an antenna 20 coupled to the wireless transmitter. The transmitter wireless communications device 17 transmits a CPM signal to the receiver wireless communications device 11. For example, the transmitter wireless communications device 17 may use a 4-ary variant of MSK modulation.

The receiver wireless communications device 11 includes a wireless receiver 12, an antenna 16 coupled to the wireless receiver, and a demodulator 13 coupled downstream from the receiver. As shown in the illustrated embodiment, the demodulator 13 comprises a processor 14, and a memory 15 cooperating therewith to perform the functions of the demodulator. In other embodiments, the demodulator 13 may comprise a software module.

The demodulator 13 uses the partial trellis of the transmitted CPM waveform to non-coherently demodulate the received signal from the transmitter wireless communications device 17. In other words, the receiver wireless communications device 11 does not know the frequency and phase offset of the received signal. The receiver wireless communications device 11 does have the symbol timing of the received signal. If the symbol timing is not known, multiple hypotheses of symbol timing could be used similar to the frequency banks (i.e. symbol timing banks).

The demodulator 13 begins the demodulation process by generating a plurality of waveform banks (Blocks 31 & 33). Each waveform bank has a respective different frequency offset associated therewith. For example, one waveform bank may be associated with the received signal not having a frequency offset, i.e. 0 frequency offset, and two other waveform banks may be associated with ±X Hz.

More specifically, the demodulator 13 generates each waveform bank based upon a subset of the CPM trellis structure comprising a plurality of transition paths (or CPM trajectories) spanning multiple symbols which end in a same final state. In particular, the demodulator 13 generates a correlation value for each transition path in a subset of the CPM trellis structure. In some embodiments, the demodulator 13 generates each waveform bank based upon a subset of the CPM trellis structure spanning a plurality of symbols and a plurality of transition paths which end in a same final state.

The number of symbols spanned by the subset of the trellis structure depends on the CPM modulation parameters and the available resources in the demodulator 13. The number of waveform banks (i.e. frequency offset banks) will depend on the performance requirements of system and the available resources.

Figure 3:
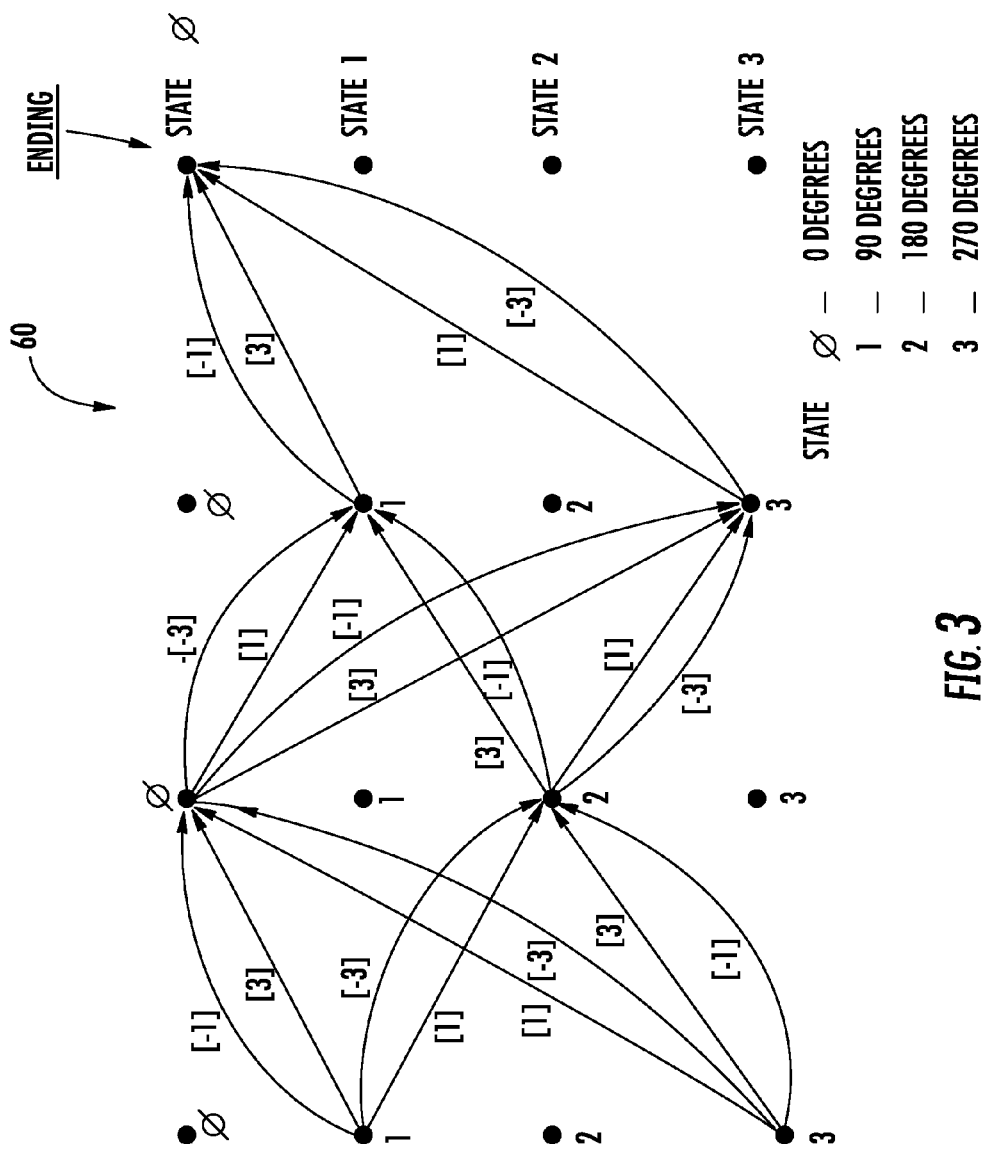
FIG. 3 is a graph illustrating an embodiment of a subset of a CPM trellis (i.e. a partial trellis for a 4-ary variant of MSK) for the receiver wireless communications device of FIG. 1.

Referring briefly to FIG. 3, a subset of a CPM trellis 60 for an exemplary embodiment is shown and illustratively includes a plurality of transition paths, i.e. 58. The subset of a CPM trellis 60 is for a 4-ary h=1/2 1REC CPM. As will be appreciated by those skilled in the art, this 4-ary CPM has a {−3, −1, 1, 3} symbol alphabet, and the CPM trellis only has four phase states (0, 90, 180, and 270 degrees). Also, since this modulation has L=1 CPM phase trajectory, each symbol remains independent of each other. Also, as will be appreciated by those skilled in the art, the subset of a CPM trellis 60 shown in FIG. 3 is only a partial diagram but provides all necessary paths to generate a waveform bank.

In particular, the modulation illustratively includes a standard h=1/2 4-ary CPM constellation with a 1 symbol rectangular frequency pulse. In this 4-ary CPM modulation scheme, there are four symbols {−3, −1, 1, and 3}. A positive-valued symbol will transition in a counter-clockwise direction. Similarly, a negatively-valued symbol with transition in a clockwise direction. The non-coherent CPM demodulation scheme honors the relative phase transitions from symbol to symbol but the phase of the final correlation is discarded. So, the correlation is complex-valued (with real and imaginary components) and the magnitude of the multi-symbol correlation is used to determine the winning middle symbol (bits) and the phase (inverse tangent of imaginary/real) is ignored. When drawing the trellis and generating the correlation vectors, the assumed end state is zero degrees. Note that the incoming signal does not terminate at zero degrees for every incoming symbol. Again, the actual phase of the incoming signal does not affect the performance of the correlation since the magnitude of the correlation is the basis of the decision. Only the relative symbol-to-symbol phase transition is expected to match the partial CPM-trellis.

Once the correlation values have been calculated, the demodulator 13 determines a correlation output metric for each waveform bank (Block 35). Additionally, the demodulator 13 determines the correlation output metric for each waveform bank based upon the correlation values therein. For example, the demodulator 13 may generate the correlation output metric using an average value of the maximum or the minimum correlation values within each waveform bank.

The demodulator 13 processes the plurality of correlation output metrics from the corresponding plurality of waveform banks and selects a waveform bank for demodulating the received signal based upon the correlation output metrics (Block 37). For example, the demodulator 13 may process a plurality of symbols and select the waveform bank that has the highest correlation output metric a majority of times. In other embodiments, the correlation output metrics may be averaged over a certain number of symbols, which may delay decoding by the averaging range. In some power limited embodiments, the demodulator 13 may deactivate some of the waveform banks after an initial processing of the correlation output metrics to conserve power and processing resources.

The demodulator 13 demodulates the received signal using the selected waveform bank and the associated frequency offset (Blocks 39 & 41). In some embodiments, the demodulator 13 may be configured to demodulate a middle symbol in time, the middle symbol in time generating a respective correlation value and being determined based upon a threshold, i.e. the symbol that generates the largest or smallest correlator output value.

In certain embodiments, the demodulator 13 may demodulate the received signal based upon the following formula.

$$s(t) = \sqrt{2E_S/T_s} \cos\left(2\pi ft + 2\pi \sum_{i=0}^{n} \alpha_i h_i q(t - iT_s)\right)$$

In this formula, $E_S$ is the symbol energy; $T_s$ is the symbol time; f is the carrier frequency; $\alpha = \{\alpha_i\}$ are M-ary data symbols, M even, taken from the alphabet $\{+/-1, +/-3, \ldots, (M-1)\}$; $h_i$ is a modulation index; q(t) is the phase response and is normalized such that q(t)=0 for t≤0, q(t)=1/2 for t≥LT; and L is the memory of the CPM scheme.

Figure 4:
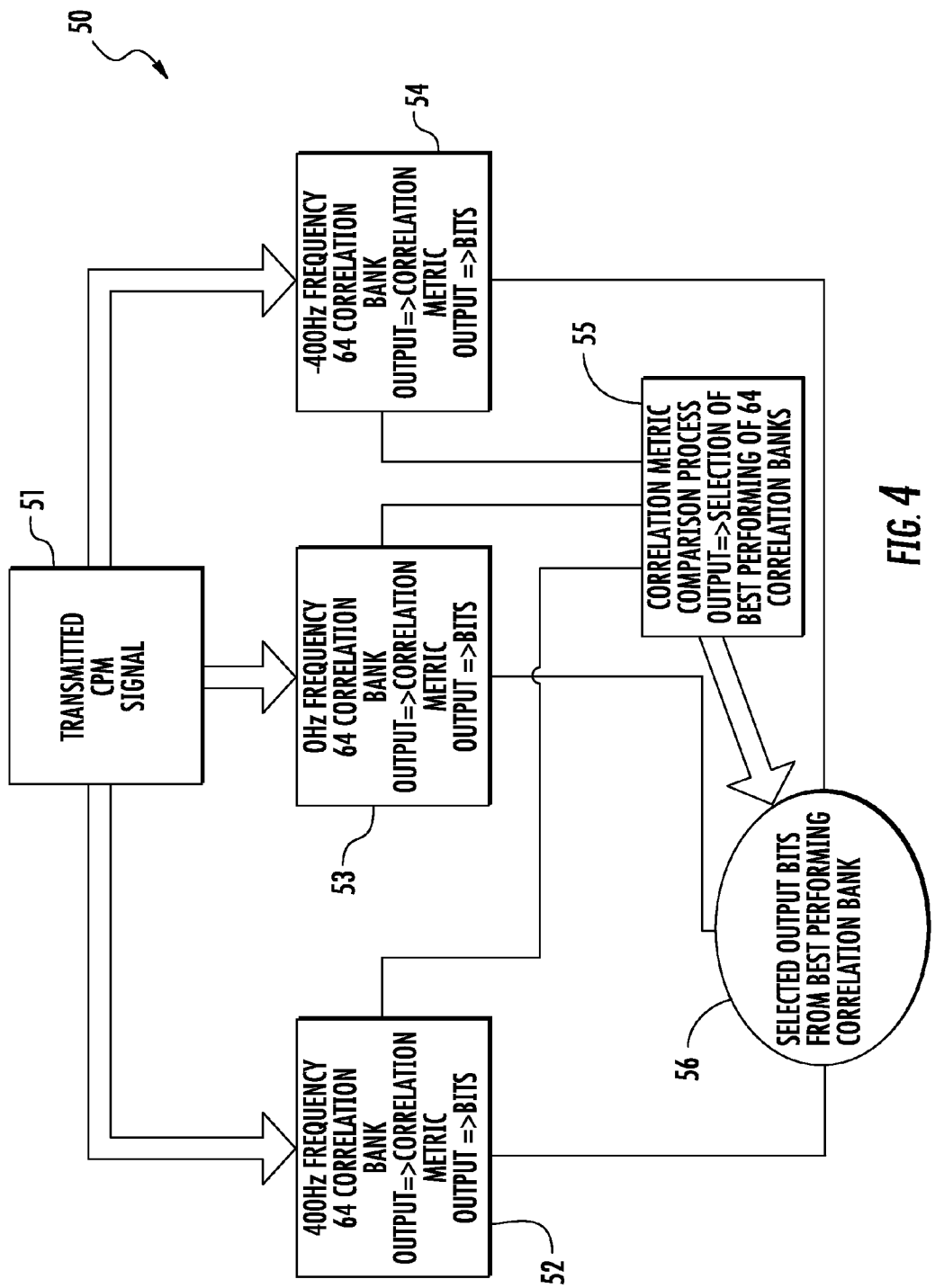
FIG. 4 is a schematic block diagram of another embodiment of the receiver wireless communications device, according to the present invention.

Referring now additionally to FIG. 4, an exemplary embodiment of the receiver wireless communications device 50 is shown. The receiver wireless communications device 50 includes a receiver module 51 for receiving the transmitted CPM signal, and a plurality of waveform banks 52-54, each receiving the CPM signal. Each waveform bank 52-54 is associated with a different frequency offset, i.e. 400 Hz frequency offset, 0 Hz frequency offset, and −400 Hz frequency offset, respectively. Each waveform bank 52-54 includes 64 correlations (i.e. 64 transition paths). The receiver wireless communications device 50 includes a correlation metric comparison module 55 for receiving the outputs of the waveform banks 52-54 and selecting the most desirable waveform bank to demodulate the received signal. The receiver wireless communications device 50 includes an output module 56 receiving the decision for the selected waveform bank, which receives the demodulated bits from the waveform banks 52-54.

Figure 5:
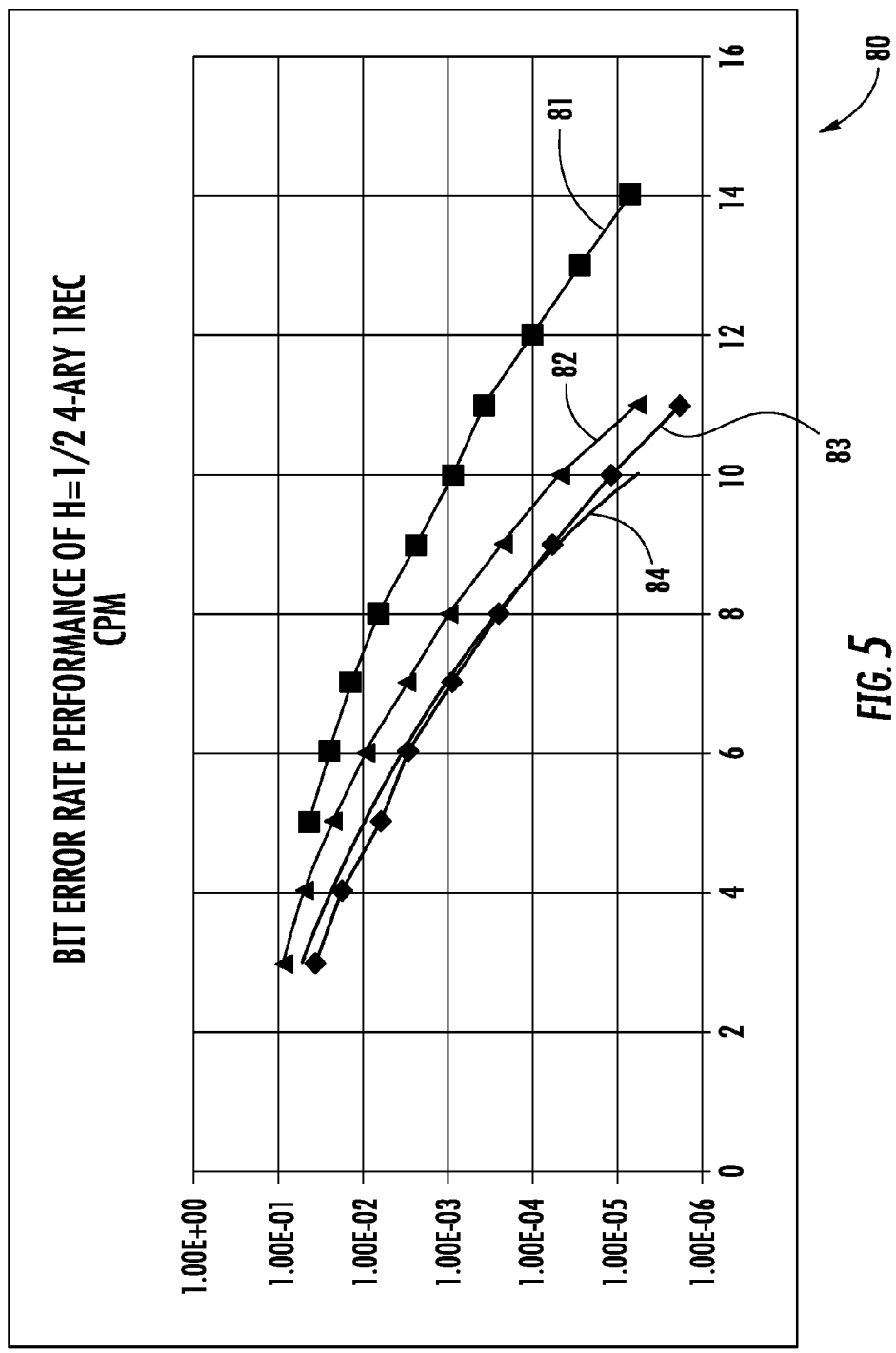
FIG. 5 is a graph illustrating performance of the receiver wireless communications device, according to the present invention.

Referring now additionally to FIG. 5, a chart 80 illustrates the BER performance of an embodiment of the receiver wireless communications device 11 for varying the number of symbols spanned. In particular, the chart 80 includes: curve 81, which illustrates the BER performance for a typical non-coherent frequency shift keying (FSK) demodulation where h=1/2 (i.e. 1 symbol spanned); curve 82, which illustrates the BER performance for the receiver wireless communications device 11 when the waveform banks spans 2 symbols of time; curve 83, which illustrates the BER performance for a typical coherent demodulator; and curve 84, which illustrates the BER performance for the receiver wireless communications device 11 when the waveform banks spans 3 symbols of time.

Figure 6:
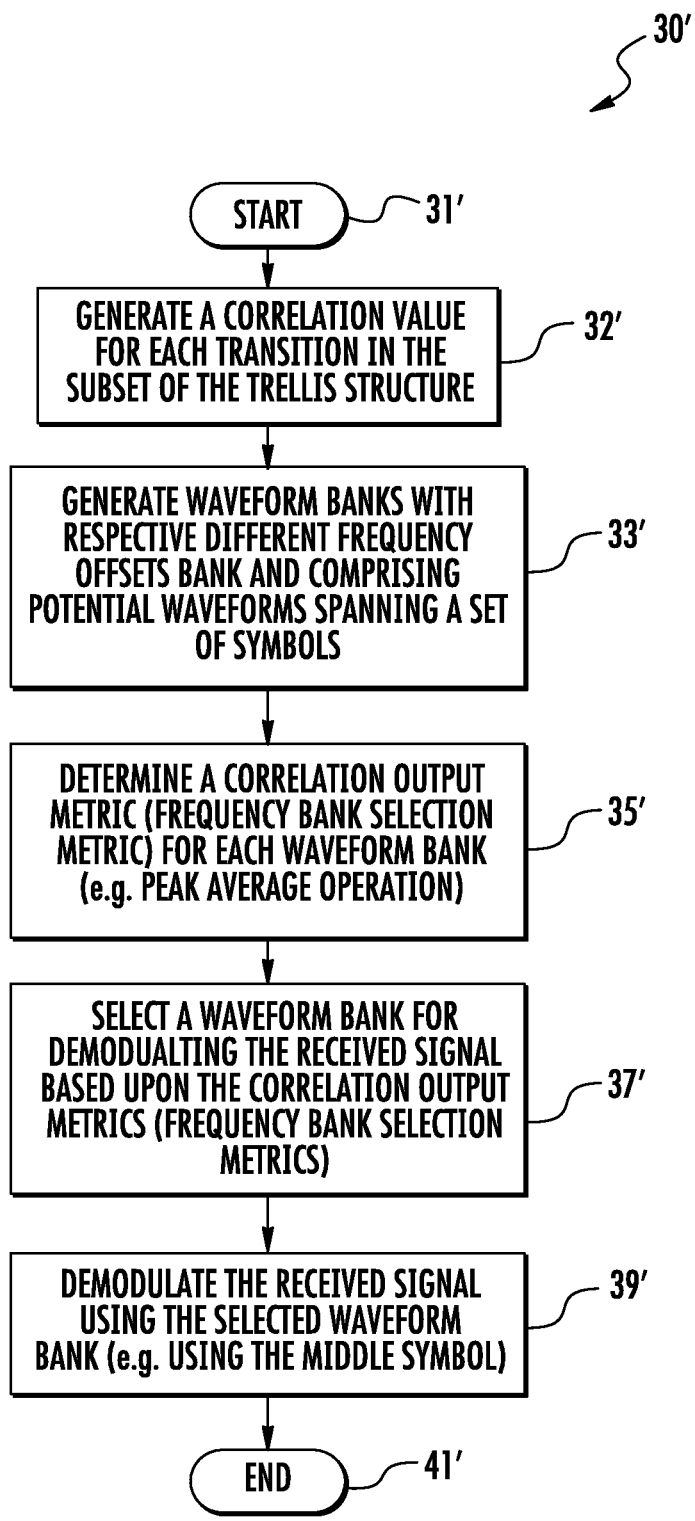
FIG. 6 is a flowchart illustrating operation of another embodiment of the receiver wireless communications device, according to the present invention.

Referring now to FIG. 6, a flowchart 30' for another embodiment of a method of operation for the receiver wireless communications device 11 is now described. In this embodiment of the method, those elements already discussed above with respect to FIG. 2 are given prime notation and most require no further discussion herein. This embodiment differs from the previous embodiment in that the method further includes at Block 32' the generation of the individual correlation values for each transition in the partial trellis structure. Moreover, at Block 33', the waveform bank comprises a plurality of waveforms spanning multiple symbols. At Block 35', the correlation output metric may be based upon a maximum or minimum averaging operation, and at Block 39', the demodulation may be performed on the middle symbol.

Advantageously, the receiver wireless communications device 11 approaches the performance of typical coherent demodulators and provides improvement over the typical non-coherent demodulators. The receiver wireless communications device 11 may allow the demodulation of some CPM waveforms with close to coherent performance without the need to track phase and frequency, and combines the frequency bank concept with multiple-symbol correlations. The receiver wireless communications device 11 includes multiple symbol correlations that are phase insensitive. If a Hz/sec demodulation requirement exists, the receiver wireless communications device 11 can control how quickly the frequency bank is allowed to change. Also, to reduce MIPS, the receiver wireless communications device 11 can begin with all frequency bank hypothesis and then based on average metrics, keep a small subset of frequency banks.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
a receiver; and
a demodulator coupled downstream from said receiver and configured to use a continuous phase modulation (CPM) waveform to non-coherently demodulate a received signal by at least
  generating a plurality of waveform banks, each waveform bank having a respective different frequency offset associated therewith,
  determining a correlation output metric for each waveform bank,
  selecting a waveform bank for demodulating the received signal based upon the correlation output metrics of the plurality of waveform banks, and
  demodulating the received signal using the selected waveform bank and the associated frequency offset.

2. The wireless communications device of claim 1 wherein said demodulator is configured to generate each waveform bank based upon a subset of a CPM trellis structure spanning a plurality of symbols and a plurality of transition paths which end in a same final state.

3. The wireless communications device of claim 2 wherein said demodulator is configured to generate a correlation value for each transition path in the subset of the CPM trellis structure.

4. The wireless communications device of claim 1 wherein said demodulator is configured to demodulate a middle symbol in time, the middle symbol in time generating a respective correlation value and being determined based upon a threshold.

5. The wireless communications device of claim 3 wherein said demodulator is configured to determine the correlation output metric for each waveform bank based upon the correlation values therein.

6. The wireless communications device of claim 2 wherein said demodulator is configured to generate each waveform bank comprising a plurality of potential waveforms spanning multiple symbols.

7. The wireless communications device of claim 6 wherein said demodulator generates each waveform bank to span the multiple symbols based upon respective waveform states and the CPM trellis structure.

8. The wireless communications device of claim 1 wherein said demodulator is configured to determine the correlation output metric for each waveform bank based an average value of at least one of minimum and maximum correlation values therein.

9. The wireless communications device of claim 1 wherein said demodulator is configured to demodulate the received signal using a 4-ary version Minimum-shift keying (MSK) modulation.

10. A wireless communications device comprising:
a receiver; and
a demodulator coupled downstream from said receiver and configured to non-coherently demodulate a received continuous phase modulation (CPM) signal by at least
  generating a plurality of waveform banks based upon a subset of a CPM trellis structure spanning a plurality of symbols and a plurality of transition paths which end in a same final state, each waveform bank having a respective different frequency offset associated therewith,
  determine a plurality of correlation values for each waveform bank,
  determining a correlation output metric for each waveform bank based upon the plurality of correlation values,
  selecting a waveform bank for demodulating the received CPM signal based upon the correlation output metrics of the plurality of waveform banks, and
  demodulating the received CPM signal using the selected waveform bank and the associated frequency offset.

11. The wireless communications device of claim 10 wherein said demodulator is configured to generate the plurality of transition paths, the plurality of transition paths ending in a same final state.

12. The wireless communications device of claim 11 wherein said demodulator is configured to generate each correlation value respectively for each transition path in the subset of the CPM trellis structure.

13. The wireless communications device of claim 10 wherein said demodulator is configured to demodulate a middle symbol in time, the middle symbol in time generating a maximum or minimum correlation value.

14. The wireless communications device of claim 10 wherein said demodulator is configured to generate each waveform bank comprising a plurality of potential waveforms spanning multiple symbols.

15. The wireless communications device of claim 14 wherein said demodulator generates each waveform bank to span the multiple symbols based upon respective waveform states and the CPM trellis structure.

16. The wireless communications device of claim 10 wherein said demodulator is configured to determine the correlation output metric for each waveform bank based upon an average value of at least one of minimum and maximum correlation values therein.

17. A method of non-coherently demodulating a received signal having a continuous phase modulation (CPM) waveform with a wireless communications device comprising a demodulator coupled downstream from a receiver, the method comprising:
  using the demodulator to generate a plurality of waveform banks, each waveform bank having a respective different frequency offset associated therewith;
  using the demodulator to determine a correlation output metric for each waveform bank;

using the demodulator to select a waveform bank for demodulating the received signal based upon the correlation output metrics of the plurality of waveform banks; and using the demodulator to demodulate the received signal using the selected waveform bank and the associated frequency offset.

18. The method of claim 17 further comprising using the demodulator to generate each waveform bank based upon a subset of a CPM trellis structure spanning a plurality of symbols and a plurality of transition paths which end in a same final state.

19. The method of claim 18 further comprising using the demodulator to generate a correlation value for each transition path in the subset of the CPM trellis structure.

20. The method of claim 17 further comprising using the demodulator to demodulate a middle symbol in time, the middle symbol in time generating a respective correlation value and being determined based upon a threshold.

21. The method of claim 19 further comprising using the demodulator to determine the correlation output metric for each waveform bank based upon the correlation values therein.

22. The method of claim 18 further comprising using the demodulator to generate each waveform bank comprising a plurality of potential waveforms spanning multiple symbols.

23. The method of claim 22 further comprising using the demodulator to generate each waveform bank to span the multiple symbols based upon respective waveform states and the CPM trellis structure.

24. The method of claim 17 further comprising using the demodulator to determine the correlation output metric for each waveform bank based upon an average value of at least one of minimum and maximum correlation values therein.

25. The method of claim 17 further comprising using the demodulator to demodulate the received signal using a 4-ary version Minimum-shift keying (MSK) modulation.

* * * * *